(No Model.)

W. H. REED.
ANIMAL TRAP.

No. 284,759. Patented Sept. 11, 1883.

Witnesses:
Geo. H. Strong.
J. H. Strouse

Inventor,
Wm H. Reed
By
Dewey & Co.
Attorneys

UNITED STATES PATENT OFFICE.

WILLIAM H. REED, OF SAN FRANCISCO, CALIFORNIA.

ANIMAL-TRAP.

SPECIFICATION forming part of Letters Patent No. 284,759, dated September 11, 1883.

Application filed June 22, 1883. (No model.)

*To all whom it may concern:*

Be it known that I, WILLIAM H. REED, of the city and county of San Francisco, State of California, have invented an Improvement in Animal-Traps; and I hereby declare the following to be a full, clear, and exact description thereof.

My invention relates to the class of animal-traps, and to a certain new and useful improvement in that class, commonly known as the "gravitating-platform trap."

My invention consists in the peculiar weighted platforms hereinafter fully described, reference being made to the accompanying drawings, in which—

Figure 1:
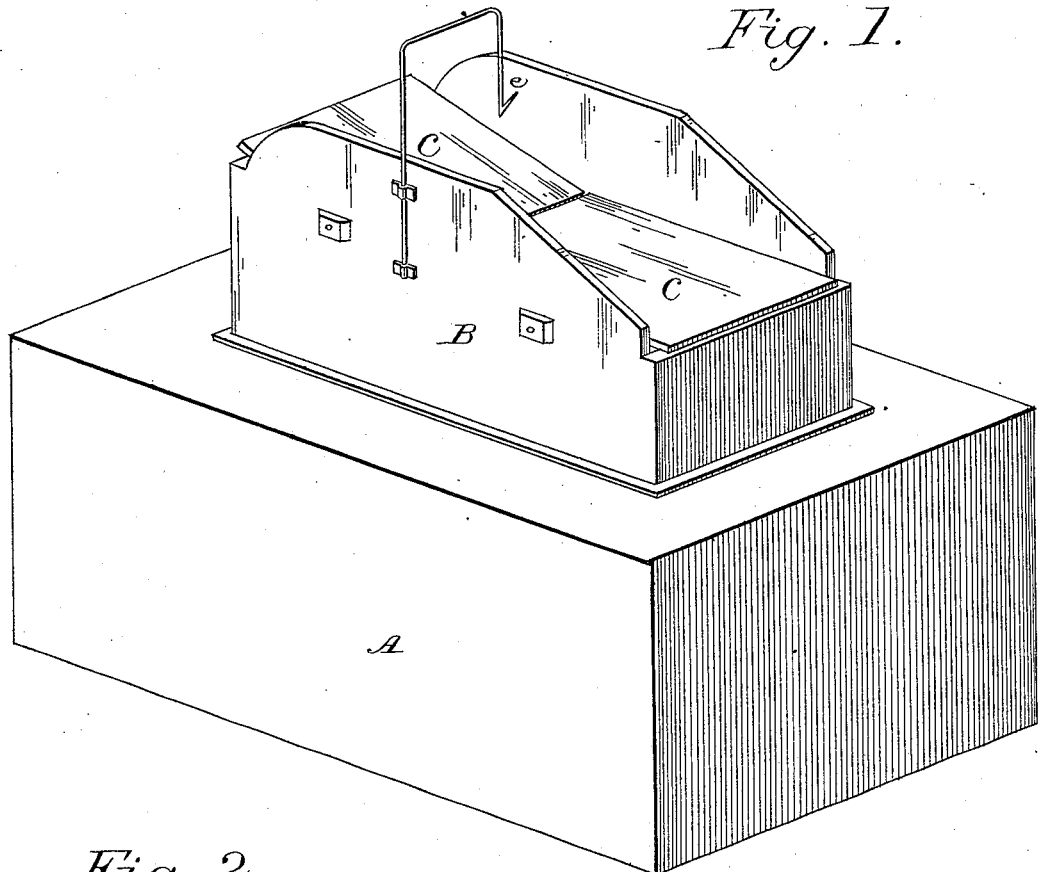
Figure 2:
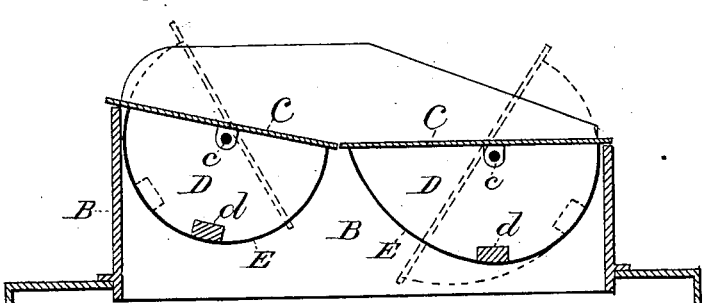
Figure 3:
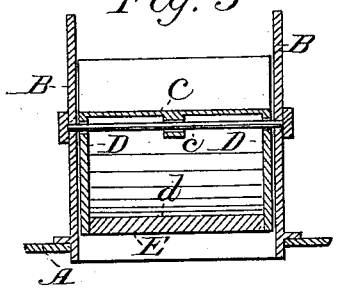

Figure 1 is a perspective view. Fig. 2 is a longitudinal section. Fig. 3 is a transverse section through the casing B.

A is a vessel or cage, which is designed to contain water for drowning the vermin precipitated therein. Fitted in the top of this is a casing, B, communicating with said vessel. C C are the platforms. These are loosely mounted upon transverse shafts *c c* in casing B, and when in a horizontal position form a cover for said casing. Their outer ends rest upon the ends of the casing; but their inner ends are free, and any weight put upon them inside of their axial line will cause them to drop or oscillate, thus precipitating whatever is upon them. In order to return them to position, I have weighted them below their pivots or axes of oscillation, thereby forcing them to return to equilibrium as soon as the weight is removed. This I accomplish in any suitable manner, though I here show a cross-bar *d*, of lead, mounted in the semicircular sides D of the platforms. In order to form a smooth under surface to prevent the animals, after being precipitated, from obtaining any hold or support, I inclose the bottoms and weight-bar by sheets of metal E, tacked to the sides D. This also makes a neat appearance.

The bait is to be suspended from a hook, *e*, over the line of meeting of the two platforms, so that the animal in endeavoring to reach it will necessarily approach the inner edges or center of the trap, when his foundation will give way and precipitate him. The platforms return at once to position. Suitable approaches will be provided to enable the animal to get on top of the trap.

I am aware that both springs and weights have been heretofore used to return the gravitating platform, and I do not claim means for this purpose, broadly, but confine myself to what I consider the simplest and most effective construction. The return is instantaneous and certain. The platform may be mounted with great delicacy and oscillate with the least weight. This construction utilizes space and makes a well-appearing device.

Having thus described my invention, what I claim as new, and desire to secure by Letters Patent, is—

In an animal-trap, the vessel A and top casing, B, in combination with the pivoted or oscillating platforms C in said casing, having sides D, the weight-bars *d*, mounted in said sides, below the center of motion of the platforms, and the inclosing-sheets E, substantially as herein described.

In witness whereof I have hereunto set my hand.

WILLIAM H. REED.

Witnesses:
    JOS. SCHERER,
    LOUIS LANG.